United States Patent

Bookless

[11] 3,981,582
[45] Sept. 21, 1976

[54] MICROFILM COPYBOARD WITH DOCUMENT INDEX

[75] Inventor: George William Bookless, Franklin Park, Ill.

[73] Assignee: Bell & Howell Company, Chicago, Ill.

[22] Filed: Sept. 30, 1975

[21] Appl. No.: 617,471

[52] U.S. Cl. .............................. 355/75; 354/105; 355/39
[51] Int. Cl.² .................................... G03B 27/62
[58] Field of Search .................... 355/75, 76, 39; 354/292, 105, 354; 248/441 R

[56] References Cited
UNITED STATES PATENTS

| | | |
|---|---|---|
| 1,743,310 | 1/1930 | Beidler ............................... 355/75 |
| 3,710,696 | 1/1973 | Tucker et al. ...................... 354/105 |

Primary Examiner—Joseph W. Hartary
Attorney, Agent, or Firm—Robert A. Walsh

[57] ABSTRACT

A copyboard (especially — although not exclusively — for microfilm cameras) has a movable document guide which slides diagonally. A counter is mounted on the document guide to display a frame identifying number, which appears adjacent the image in each frame. Since the counter is mounted on the document guide, the number which it displays always appears along side the photographic image, regardless of the original document size. A blip image is also placed on the copyboard to provide a white spot that facilitates automatic searching. When a special operation is performed, the blip image is made longer in order to provide a command signal.

10 Claims, 7 Drawing Figures

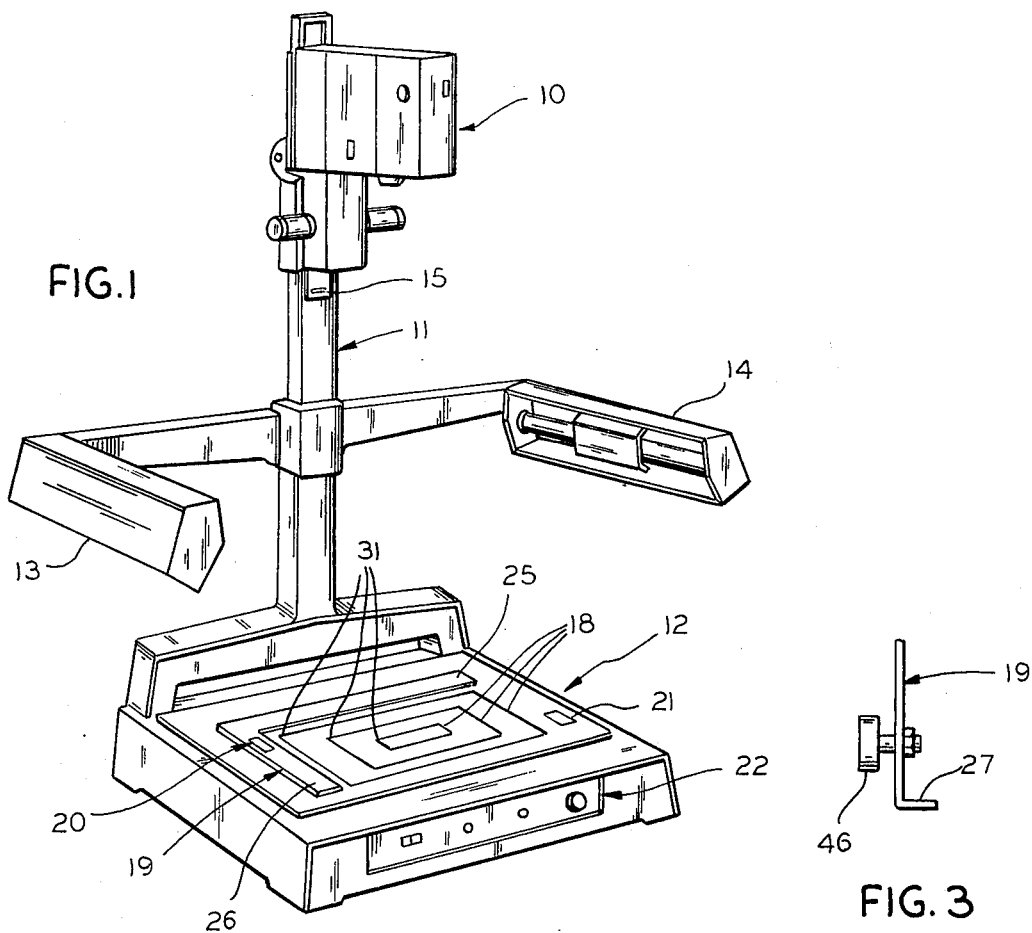
FIG.1
FIG.3
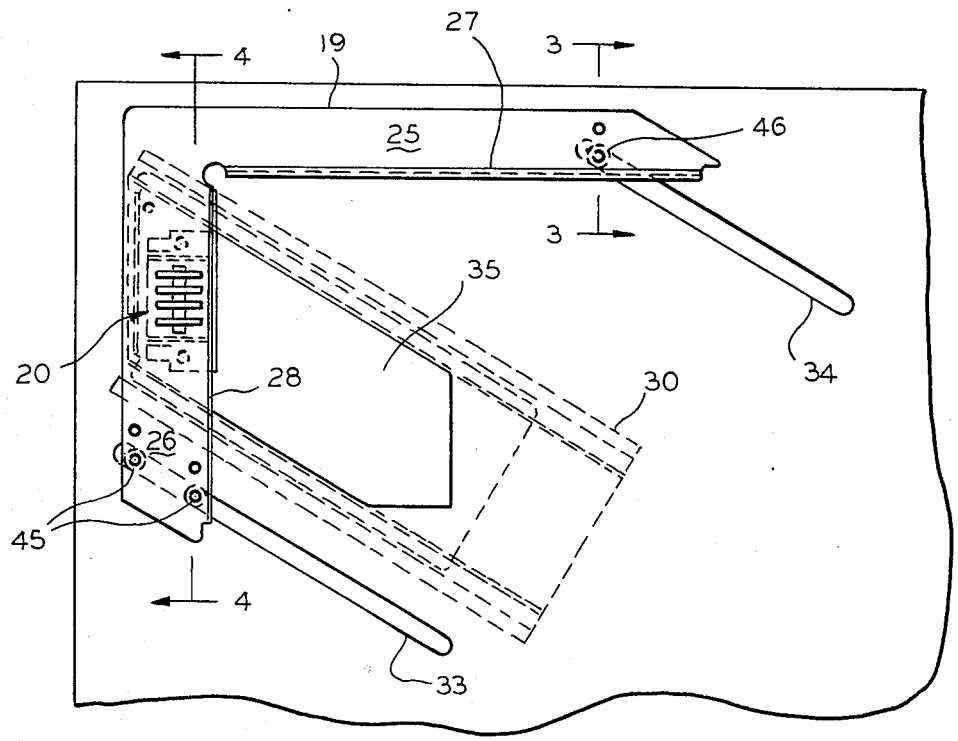
FIG.2

MICROFILM COPYBOARD WITH DOCUMENT INDEX

This invention relates to copyboards and more particularly to copyboards especially — although not exclusively — adapted for use on or in conjunction with low cost, compact, semi-portable microfilm cameras, for providing automatic frame identification and associated blip marks.

Microfilm systems are generally provided with a copyboard, camera, lights, and common support structure. The copyboard is adapted to receive and support a document, book, or the like (hereinafter generically called "documents") within the image area photographed by the camera. Very often the copyboard is marked with indices to locate the exact area covered by the camera for different height adjustments, and thereby where the document should be placed. The camera is aimed at the copyboard and photographs anything within the sight of the area marked by these indices. The lights are generally mounted on the support and aimed toward such document, to provide exactly the proper level of uniform illumination for the camera and type of film. In addition, the supporting structure usually has a telescoping post, or the equivalent, so that the camera may be raised or lowered to change the reduction ratios.

This type of microfilming system presents two problems relating to automatic searching and to frame identification. Not all documents are the same size; therefore, it is often necessary to align different documents with different indices on the copyboard. Also, as the camera is moved up or down on the telescoping mount, the relative size of the document image will change. A flexible indexing system is desired, but it is difficult to make it always align with the document image, as the reduction ratio or document size varies.

Modern microfilm systems use electronic searching which automatically locates specified images on a microfilm. This searching often uses an optical scanning system which reads and counts special search marks (called "blips") which are photographically recorded on the microfilm simultaneously with the image photography. Sometimes, it is desirable to also use special or command blip marks that cause the system to perform some special function such as to cut the film at a certain location. In any event, it is necessary to locate the blip mark on the microfilm at a precise point scanned by the mark reading equipment and with respect to the image location. Therefore, it may be necessary to relocate the blip image on the copyboard, when a document is photocopied so that its image is properly indexed on the film.

It is also necessary to provide means for facilitating a manual search for a particular image on a microfilm. Hence, it is desirable to place a frame number adjacent each document as the original is photographed on microfilm. Therefore, to locate the image during a manual search, it is only necessary to look for the frame number on the film. Here again, it is desirable to provide means for changing the location on the copyboard of a device used for displaying the frame number, as the document loction changes. It is also desirable for the frame number to be automatically relocated — if desirable — each time that a document is placed on the copyboard.

Accordingly, an object of the invention is to provide new and improved means for automatically locating — or relocating — both a document and its frame digital or number display, at proper position on the copyboard. In this connection, an object of the invention is to automatically relocate a frame number display and indicator whenever the document index is changed. Further, an object is to provide for relocation of a blip mark as the document index is changed. Here, an object is to automatically record a search blip mark unless a special action is undertaken to record a command mark.

Another object is to accomplish the foregoing objects in a very low cost, simple, and foolproof manner.

A further object is to provide a means for accomplishing such objects in a generalized manner having applicability to virtually any microfilm system.

In keeping with an aspect of the invention, these and other objects are accomplished by providing a copyboard having a document guide mounted for movement diagonally across the board. A digital displaying counter is mounted on the document guide to identify each frame on its photographed image. Since the counter is mounted directly on the document guide, the digital image appears in each frame, at a fixed location along side the image of the document. A blip image is also provided at a location on the copyboard, for photographic recording on the microfilm, adjacent the frame. When a special function is performed the blip image is made longer (or shorter) in order to provide a recognizable command signal.

The nature of the invention will be understood best from a study of the attached drawings wherein:

FIG. 1 is a perspective view of the microfilm system;

FIG. 2 is a plan view of a movable document guide, incorporating the features of the invention;

FIG. 3 is a cross sectional view of an end of the guide, taken along line 3—3 of FIG. 2;

Figure 4:
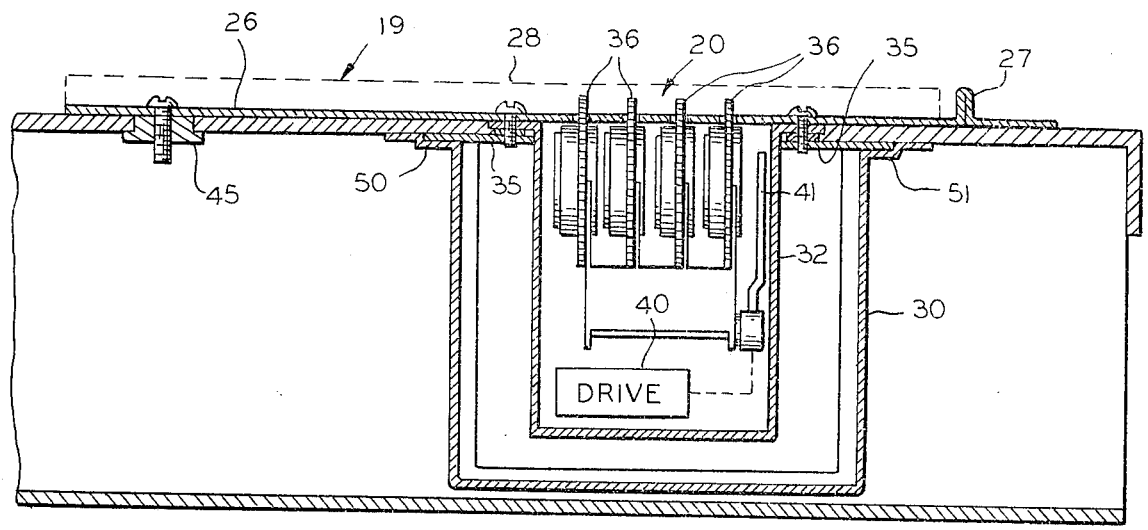
FIG. 4 is a cross sectional view of a frame counter mounted on the guide, and taken along line 4—4 of FIG. 2.

The major sub-assemblies of the microfilm system (FIG. 1) are a camera 10, mounted on a telescoping post 11, a copyboard 12, and a pair of lamps 13, 14 for uniformly illuminating the entire surface of the copyboard. The camera 10 may be any suitable type of device and may be used interchangeable with other cameras so that different films may be used by the simple expedient of switching cameras. The telescoping post slides up and down to raise or lower the camera and provide different reduction ratios. The height of the post is displayed in terms of the reduction ratio in a window 15 on the post. A pair of lamps 13, 14 are shown so that the copyboard is illuminated uniformly from two opposed points. However, this method of lighting is not critical and any other suitable lighting means may be used.

Printed on the copyboard 12 may be a plurality of guide lines or other indicia 18 which defines the image area for the camera height and helps the operator to position and center different size documents. A movable guide member 19 slides diagonally across the copyboard to any convenient position such as one identified by the indicia 18. Of course, guide 19 could also be numbered with the same reduction ratio that is displayed in the window 15. Or, the guide 19 could be moved automatically as the post 11 is telescoped. This way the operator does not have to visually align a document with the indicia lines 18. She merely places a document against the edges of the guide.

Mounted on and movable with the guide is a digital or number display, or counting device 20 which displays a series of individual frame identifying indicia. This indicia is always photographed adjacent the document in the copy area. The digital display or counter may be operated either manually or automatically, before each exposure cycle.

A blip mark 21 may also be provided on the copyboard 12, to be photographed along with the document. This blip mark is merely a white square which appears along side the image of the document recorded on the microfilm. A longer than average blip image forms a command signal which causes the microfilm system to undertake some desired function, such as cut the film. The blip mark 21 may be either permanently affixed at a specific location or movable to any desired location. It may be either manually or automatically operated.

Any suitable controls 22 may be provided on the microfilming machine. These controls may provide for making adjustments to compensate for film speed, copy contrast, or the like. They may provide for exposure and film advance. They may provide for on/off power control, or the like. Also, any suitable indicators (either visual or audible) may be provided to signal the end of film, film jammed, or other malfunctions or operating conditions. Those who are skilled in the art will readily recognize other forms of controls which may also be provided.

The mechanical details of the new and novel copyboard may be understood best from a study of the remaining FIGS. 2–7. In greater detail, the document guide 19 (FIGS. 2–4) has an L-shape with two arms 25, 26 each terminating in an upstanding lip 27, 28 for providing back stops to receive and position documents. The counter 20 is carried by one of the arms, here 26.

The copyboard 12 contains a main guideway in the form of a trough or channel 30 (FIG. 2) formed in and extending diagonally across the copyboard through the adjacent corners 31 of the document locating indicia 18, printed on the copyboard. To stabilize the document guide 19, as it slides back and forth in directions A, B, two spaced, parallel, outboard guides or grooves 33, 34 are formed in the copyboard on opposite sides of trough 30. Hence, the document guide 19 glides along a predetermined path which is both predictable and accurate owing to the locations of guides 33, 34.

As best seen in FIG. 4, the counter 20 comprises a plurality of digital or number displays, which may be cylindrical number bands, for example, each having an individually associated thumb wheel. (the digital or number display might also be a disc, slide, or the like, controlled by an individually associated knob or button.) Therefore, by manually turning the thumb wheels 36, any suitable series of digits may be displayed on the document guide. For example, FIG. 2 has been drawn to indicate that the thumb wheels are turned to display the frame identifying number "4355". Once the starting frame number is selected, an electronic drive circuit 40 (or any other suitable means) may operate on each exposure to cause a mechanism 41 to advance the counter one step. Hence, the frame identifying series of digits, displayed by the counter, may be advanced either automatically or manually, to always identify each frame as it is photographed. Moreover, since the counter is mounted on the document guide, per se, the frame identifying numbers are always located at the same position relative to the document image regardless of the previous movement of the document guide.

The nature of the mechanical details of the document guide support and transport mechanism are best seen in FIGS. 3, 4. More particularly, each of the arms includes a dependent guide button or wheel 45, 46 which ride in the guide way slots 33, 34, respectively. These guide buttons act as outrigger to stabilize the document guide. Each side of the trough or channel 30 includes a flange with a section that is offset (as at 50,51) to form a pair of opposed guide ways. Slide 35 (FIG. 2) fits into these offset guideway regions 50, 51 and forms a slidable cover over trough 30. Hence, the slide 35 and counter frame 32 may slide back and forth along the guides formed by the offset areas 50, 51. Since the guide 19 supports the counter and is attached to slide 35, the entire unit (i.e., guide 19, counter 20 and slide 35) moves as a whole.

Two different embodiments (FIGS. 6 and 7) are provided for forming the blip mark 21. In greater detail, a blip mark is explained by FIG. 5. Each strip of microfilm 55 includes a plurality or sequence of document images, such as the one at 56. Adjacent each document image, and in a fixed position relative thereto, a spot or dot (blip) is recorded when the document is photographed, as shown at 57. Hence, an automatic searching device may detect the start of a microfilm strip and then count the blips to locate a predetermined image. If a longer than usual blip mark 58 is recorded, the microfilm equipment automatically interprets it as a command signal and performs some specified function in response thereto. For example, as here shown, the command signal causes the microfilm equipment to cut the film along a line 59. If desired, the severed strip of film may then be inserted into a film carrier, punched card, or the like. Of course, any other command function could also be carried out responsive to the long blip.

The particular embodiment which is used to make the blip depends upon the nature of the work being copied. Each of these embodiments comprises a permanent image the size of a normal blip mark and an add-on image which changes such size. From FIG. 5, it is apparent that the blip 57 preferably has a predetermined position along side each document image. Hence, it must sometimes be located at one point on the copyboard when the image area is large, such as at 56, and at another place for small image areas, such as 61. Accordingly, a movable blip mark may be desirable when the image area is likely to change frequently. For this movable mark, a simple two-piece sheet metal member 65,66 (FIG. 6) is hinged together at 62. A hinge spring 64 normally causes the plates to lie in a closed position, as shown in dotted lines in FIG. 6.

In general, each plate is colored black so that its image will not appear in the picture, to any substantial degree. A small permanent white rectangle 73 of the desired blip size is painted, printed, or otherwise formed on one plate 65. Therefore, when the dual plate unit of FIG. 6 is laid, in its normally closed position on the copyboard 12, the image of white spot 63 will appear adjacent the document image as it is photographed on the microfilm.

In its normal position, spring 64 biases plate 66 over plate 65. Thereupon, plate 66 remains in the space represented in FIG. 6 by dotted line 66a. The back of plate 66 is black and when plate 66 is in the position shown by dotted line 66a, the short command blip signal 56 is formed. To obtain the longer blip image, plate 66 is moved against the bias of spring 64, and manually held during exposure in the position shown by solid lines in FIG. 6. Add-on white image 63a is a white rectangle applied to the left hand surfaces of the side of plates 66 which face upward when plate 66 is opened against the bias force of spring 64. The lower portion of image 63a extends along the length of plate 65 to its line of intersection with the white portion on plate 66. Of course, the procedure could also be reversed by reversing the bias of spring 64 whereby long mark 63 is normally on display. Then, the back of plate 66 would be entirely black, so that the white mark may be shortened by folding the plate 66 to the position 66a and manually holding it in place against the bias of spring 64.

Figure 6:
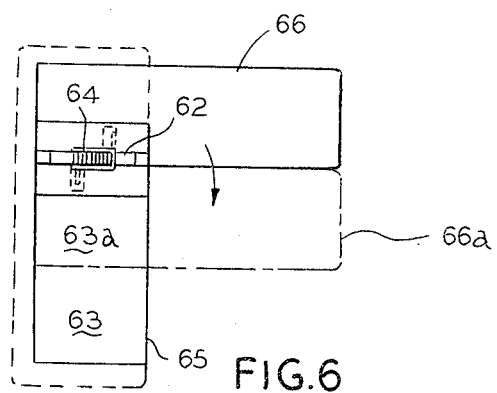
FIG. 6 is a plan view of first or mechanical embodiment of a blip mark former.

The embodiment of FIG. 6 may have a double sided adhesive tape on the back of plate 65. Thus, the unit may be laid at any convenient location on the copyboard 12 and pressed into position. Thereafter, the adhesive will retain the blip mark device in position, until it is lifted against the pull of the adhesive.

Figure 7:
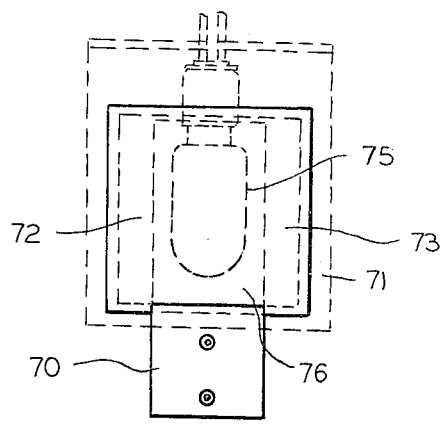
FIG. 7 is a plan view of a second or electrical embodiment of a blip mark former.
Figure 5:
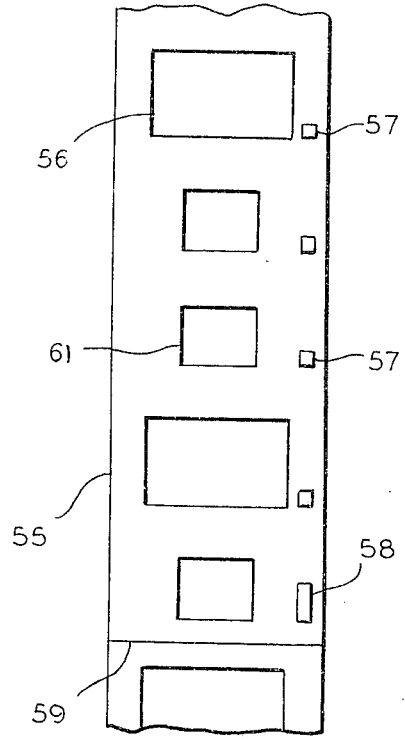
FIG. 5 is a representation (in plan view) of a strip of microfilm.

If a more permanent location on the copyboard is either necessary or desirable, or if automatic operation is desired, the embodiment of FIG. 7 may be used. Here, a permanent white mark 70 is painted, printed, or otherwise permanently fastened on the copyboard 12, so that it always appears at the same relative spot on each microfilm image.

A ground glass 71 is positioned adjacent the white mark 70. In one embodiment, the entire upper side of the glass is sand blasted and the end strips 72, 73 of the under side are masked. The glass 71 has a reflection characteristic such that it normally appears black, and hardly shows on the microfilm. A lamp 75 is located under the glass so that an add-on white area 76 appears when the lamp is lit. Hence, a lit lamp has the effect of lengthening the blip mark image from the normal size 70 to the elongated command signal size, as indicated at 58. Again, the procedures could be reversed so that the lamp is normally lit. This would then mean that the long mark is normal and that the short mark appears only when the lamp is switched off.

One advantage of the embodiment of FIG. 7 is that the lamp may be automatically turned on or off, responsive to other functions. For example, the camera, or a counter, or some other device may be provided to automatically light the lamp whenever a command signal is desired.

Those who are skilled in the art will readily perceive how various modifications may be made. Therefore, the appended claims are to be construed to cover all equivalent structures.

I claim:

1. A copyboard especially suited for use in a microfilm system, said copyboard comprising a guide member having a digital display means integrally mounted thereon, and guide member mounting means for enabling movement of said guide member and said display means across said copyboard, said guide member mounting means commprising a main guideway and spaced parallel outrigger guideways disposed on opposite sides of said main guideway.

2. The copyboard of claim 1 wherein said digital display means comprises a series of number displays having control means individually associated therewith, whereby any suitable digital display may be provided by selective operation of said individual control means.

3. The copyboard of claim 1 wherein said main guideway comprises a trough having diametrically opposed and offset sections disposed on opposite sides of said trough to form rails or paths, and a slide having edges which ride in the offset sections as said guide member and said slide move back and forth in said trough, said digital display being housed in said trough member and displayed through said guide member.

4. The copyboard of claim 3 wherein said guide member mounting means is oriented to cause said guide member to move diagonally across said copyboard.

5. The copyboard of claim 1 and means for selectively displaying a blip mark image adjacent a document, to be photocopied onto microfilm at a specific location adjacent said document.

6. The copyboard of claim 5 wherein said blip mark image is formed on a plate having a leaf which may be repositioned to change the size of said blip mark.

7. The copyboard of claim 5 wherein said blip mark is formed by a combination of a permanent image and an add-on image.

8. The copyboard of claim 7 wherein said permanent image is formed on one leaf of a hinged-together pair of spring biased plates and said add-on image is formed on the back of the other of the pair of plates.

9. The copyboard of claim 7 wherein the permanent image is formed on or permanently mounted to said copyboard and said add-on image is an electrically illuminated area immediately adjacent said permanent image.

10. The copyboard of claim 1 wherein said digital display means comprises a series of number displays, each number display having control means individually associated therewith, whereby any suitable series of digits may be displayed by selective operation of said individual control means, said main guideway comprising a channel having diametrically opposed and offset sections disposed on opposite sides thereof to form outrigger rails or paths, and a housing member having side members which ride in the offset sections as said guide member moves back and forth in said channel, said digital display being supported by said housing member and displayed through said guide member, whereby said guide member and digital display means are oriented to cause said guide member and display means to move diagonally across said copyboard, means for selectively displaying a blip mark image adjacent a document, said blip means being located to be photocopied onto microfilm at a specific location adjacent said document, said blip mark being formed by a combination of a permanent image and an add-on image.

* * * * *